United States Patent
Fritzel et al.

(10) Patent No.: US 8,256,325 B1
(45) Date of Patent: Sep. 4, 2012

(54) WHEEL FOR ROLLING STOCK HANDBRAKE

(75) Inventors: Michael P. Fritzel, Keller, TX (US); Steve Rains, Azle, TX (US)

(73) Assignee: Michael P. Fritzel, Keller, TX (US)

( * ) Notice: Subject to any disclaimer, the term of this patent is extended or adjusted under 35 U.S.C. 154(b) by 1076 days.

(21) Appl. No.: 11/340,273

(22) Filed: Jan. 26, 2006

Related U.S. Application Data

(60) Provisional application No. 60/649,667, filed on Feb. 3, 2005.

(51) Int. Cl.
  *B62D 1/04* (2006.01)
  *G05G 1/10* (2006.01)
  *B61C 11/00* (2006.01)
  *B61C 13/00* (2006.01)

(52) U.S. Cl. .......................................... 74/552; 105/26.1

(58) Field of Classification Search .................... 74/552, 74/558, 558.5; 29/894.1; 280/731; 264/129; 105/26.1; *B62D 1/06*
  See application file for complete search history.

(56) References Cited

U.S. PATENT DOCUMENTS

| | | | | |
|---|---|---|---|---|
| 1,502,540 A | * | 7/1924 | Beck | 74/552 |
| 1,511,351 A | * | 10/1924 | Michaud | 70/221 |
| 1,680,823 A | * | 8/1928 | Teed | 264/241 |
| 2,166,290 A | * | 7/1939 | Geyer | 74/552 |
| 2,718,195 A | * | 9/1955 | Bock et al. | 105/26.1 |
| 2,892,359 A | * | 6/1959 | Overman | 74/484 R |
| 3,270,581 A | * | 9/1966 | Geller | 74/552 |
| 4,118,455 A | * | 10/1978 | Byrn | 264/129 |
| 4,295,256 A | * | 10/1981 | Pascal | 29/894.32 |
| 4,353,266 A | * | 10/1982 | Grothe | 74/552 |
| 4,884,469 A | * | 12/1989 | Wrigley | 74/552 |
| 4,920,822 A | * | 5/1990 | Abiko | 74/552 |
| 5,718,151 A | * | 2/1998 | Parrish et al. | 74/552 |
| 6,164,691 A | * | 12/2000 | Hofer et al. | 280/731 |
| 6,280,674 B1 | * | 8/2001 | Kreuzer | 264/259 |
| 6,427,542 B1 | * | 8/2002 | Nicot | 73/862.326 |
| 7,104,156 B2 | * | 9/2006 | Affleck et al. | 74/552 |
| 7,182,408 B2 | * | 2/2007 | Rivers et al. | 301/37.25 |
| 7,681,336 B2 | * | 3/2010 | Noonan et al. | 37/265 |

FOREIGN PATENT DOCUMENTS

| | | | | |
|---|---|---|---|---|
| GB | 2 041 858 A | * | 9/1980 | 74/552 |
| GB | 2 058 694 A | * | 4/1981 | |

* cited by examiner

*Primary Examiner* — Vinh Luong
(74) *Attorney, Agent, or Firm* — Geoffrey A. Mantooth

(57) ABSTRACT

A wheel is for use in manually turning a shaft on rolling stock, such as for a handbrake. The wheel has a hub and a rim. The hub is made of a first material and has an opening that is structured and arranged to receive the shaft. The opening has a rotational axis. The hub has an exterior around the rotational axis, with the hub having drive surfaces relative to the rotational axis. The rim is coupled to the hub so as to engage the drive surfaces. The drive surfaces include flat surfaces and corners of a tube portion of the hub, a radially extending plate with holes therethrough and teeth in an outer edge and gussets coupled between the tube portion and the plate. The rim has an outer periphery structured and arranged to be gripped by a human hand for rotating the wheel. The rim is made of a second material that is softer than the first material.

8 Claims, 10 Drawing Sheets

WHEEL FOR ROLLING STOCK HANDBRAKE

This application claims the benefit of provisional patent application Ser. No. 60/649,667, filed Feb. 3, 2005.

FIELD OF THE INVENTION

The present invention relates to handbrake systems for rolling stock, and in particular to the wheels used to set and release the handbrakes.

BACKGROUND OF THE INVENTION

Rolling stock includes locomotives and freight cars. In general, rolling stock vehicles are equipped with handbrakes, which are brakes that can be set manually. The handbrake of a rolling stock vehicle is set and released by turning a wheel on an end of the stock. The wheel is mounted on a shaft.

Handbrakes are used, for example, when one or several vehicles have been uncoupled from a locomotive. The handbrakes are set by crew members to prevent the rolling stock from moving on the tracks.

Prior art handbrake wheels are made of metal, a design that has remained unchanged for about a century. The handbrake wheel is made of stamped steel and has a cast iron center, which center has a square opening for receiving the shaft.

One problem with the metal wheel is that a crew member can sustain a hand injury if not wearing gloves. The steel on the wheel is unfinished and offers sharp or rough edges, including burrs.

Another problem with the metal wheel is the weight. Metal wheels are heavy. As the car moves along the track, the wheel vibrates on the shaft. Because the wheel is mounted at the end of the shaft, bearings that support the shaft are subjected to wear and premature failure. Because of the heavy vibrational load, handbrake wheel manufacturers are unwilling to provide long warranties on the handbrakes.

An Australian company developed an all-plastic handbrake wheel. The wheel was monolithic, made of the same plastic throughout. However the wheel exhibited failure, cracking in the center.

SUMMARY OF THE INVENTION

It is an object of the present invention to provide a wheel for rolling stock that is lighter in weight than the prior art wheel.

It is another object of the present invention to provide a wheel for rolling stock that minimizes the risk of injury to operators.

The present invention provides a wheel for use in manually rotating a shaft on rolling stock. The wheel has a hub and a rim. The hub is made of a first material and has an opening that is structured and arranged to receive a shaft. The opening has a rotational axis. The hub has an exterior around the rotational axis. The hub exterior has drive surfaces relative to the rotational axis. The rim is coupled to the hub so as to engage the drive surfaces. The rim has an outer periphery structured and arranged to be gripped by a human hand for rotating the wheel. The rim is made of a second material that is softer than the first material.

In accordance with one aspect of the present invention the hub comprises a tube portion incorporating the opening. The tube portion has at least some of the drive surfaces in the form of flat surfaces forming a polygon when viewed in cross-section along the rotational axis. A plate extends radially from the tube portion. The plate has other of the drive surfaces. The tube portion and the plate are encompassed by the rim.

In accordance with another aspect of the present invention the plate comprises holes therethrough. The holes comprise the other of the drive surfaces.

In accordance with still another aspect of the present invention the wheel further comprises gussets coupled between the tube portion and the plate. The gussets form still others of the drive surfaces.

In accordance with still another aspect of the present invention the hub is made of metal and the rim is made of plastic.

In accordance with still another aspect of the present invention the hub is made of a first plastic and the rim is made of a second plastic.

In accordance with still another aspect of the present invention the rim comprises an outer rim having the outer periphery and a central area. The outer rim is coupled to the central area by spokes.

In accordance with still another aspect of the present invention the plate comprises teeth around an outer edge of the plate, the teeth comprise the other of the drive surfaces.

In accordance with still another aspect of the present invention the plate comprises holes therethrough, which holes comprise the other of the drive surfaces. Gussets are coupled between the tube portion and the plate, which gussets form still other of the drive surfaces.

In accordance with still another aspect of the present invention the plate comprises teeth around an outer edge of the plate, the teeth comprise the other of the drive surfaces. Gussets are coupled between the tube portion and the plate, which gussets form still other of the drive surfaces.

DESCRIPTION OF THE PREFERRED EMBODIMENT

Figure 1:
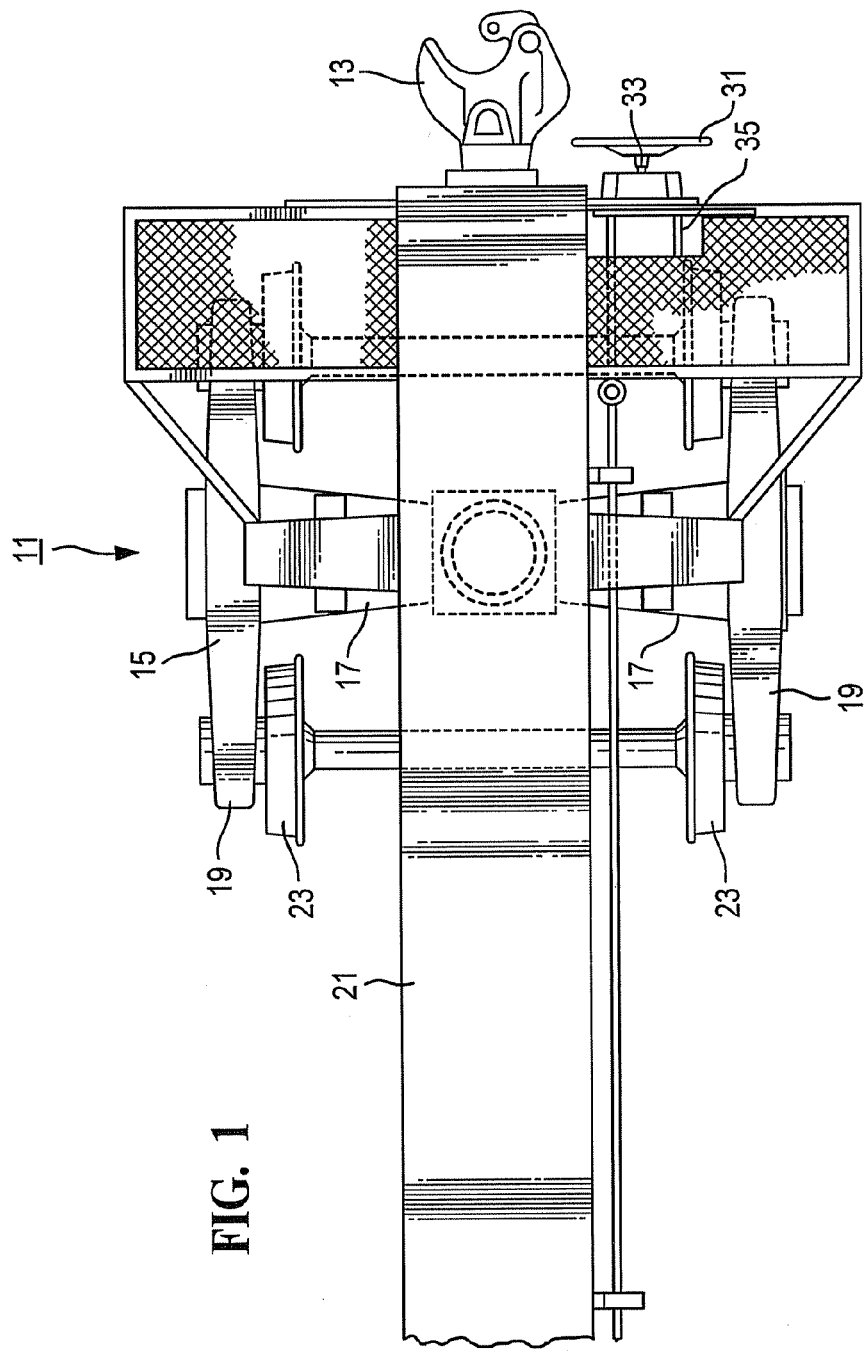
FIG. 1 is a plan view of an end of a rolling stock car, showing a handbrake wheel.
Figure 2:
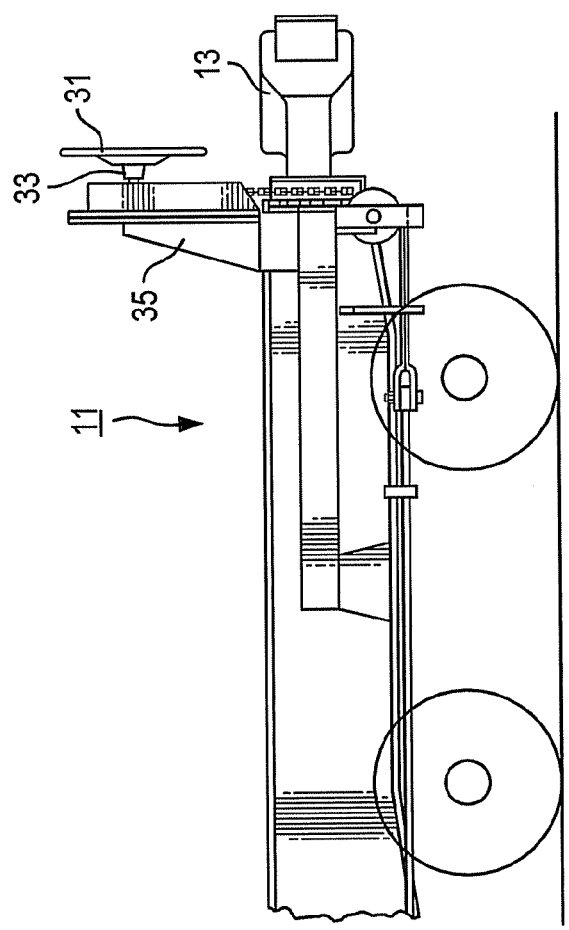
FIG. 2 is a side elevational view of the car of FIG. 1.

The wheel of the present invention can be used on all types of rolling stock 11. By way of example, the handbrake end (the "B-end") of a typical rolling stock car assembly to which the present invention is applied is illustrated in FIGS. 1 and 2. The car is provided with a conventional semi-automatic coupler 13 and a truck 15. The truck 15 carries a body bolster 17 between frames 19, which frames support the center sill 21. The wheels 23 are rotatably coupled to the frames 19.

The end of the car is provided with a conventional handbrake. The handbrake has a wheel 31 mounted to a shaft 33 which shaft is received in a vertical bracket 35. The end of the shaft 33 is threaded and protrudes through the wheel 31 to receive a washer and nut (not shown). The nut secures and retains the wheel 31 onto the shaft 33.

An operator grips the outer rim and turns the wheel 31 to set or release the brake. Turning the wheel 31 in one direction sets the brake; turning the wheel in the opposite direction releases the brake.

In the description that follows, the terms "front side" and "back side" are used with reference to the orientation of the wheel as seen by an operator who is gripping the wheel to turn it. The front side faces the operator, while the back side faces away from the operator.

Figure 3:
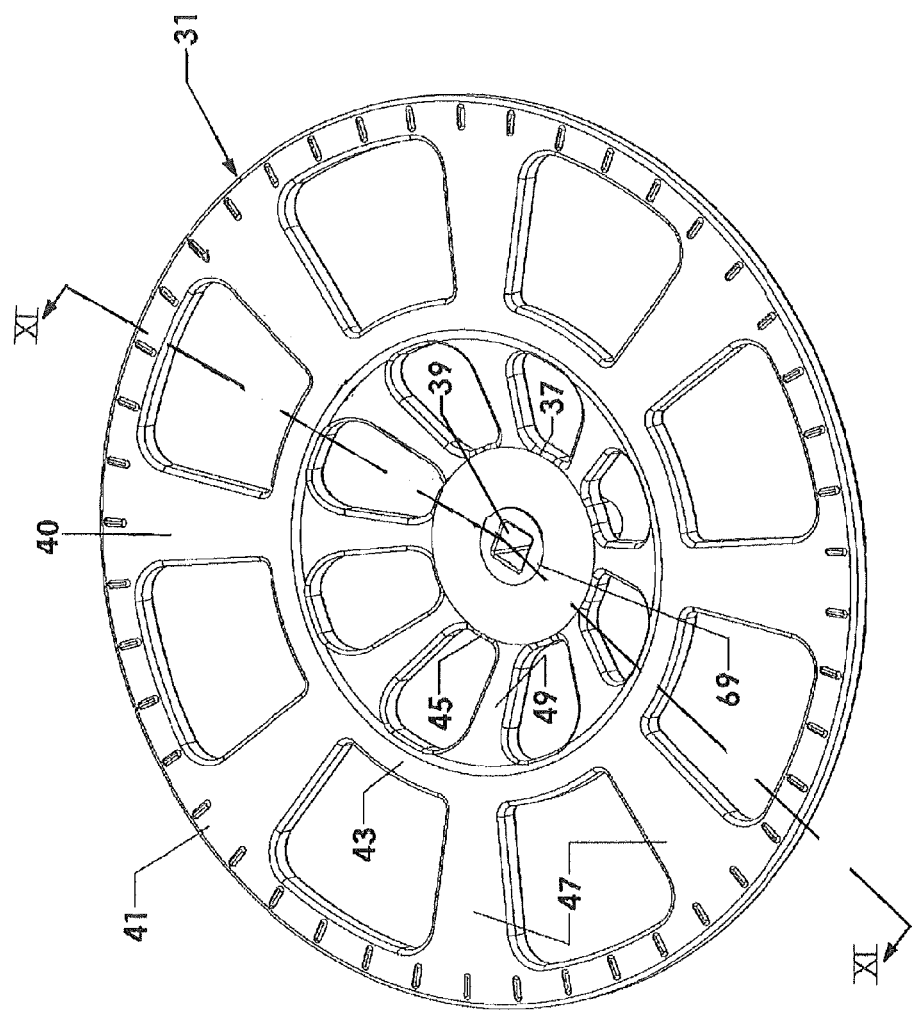
FIG. 3 is an isometric view of front side of the handbrake wheel of the present invention, in accordance with a preferred embodiment.
Figure 4:
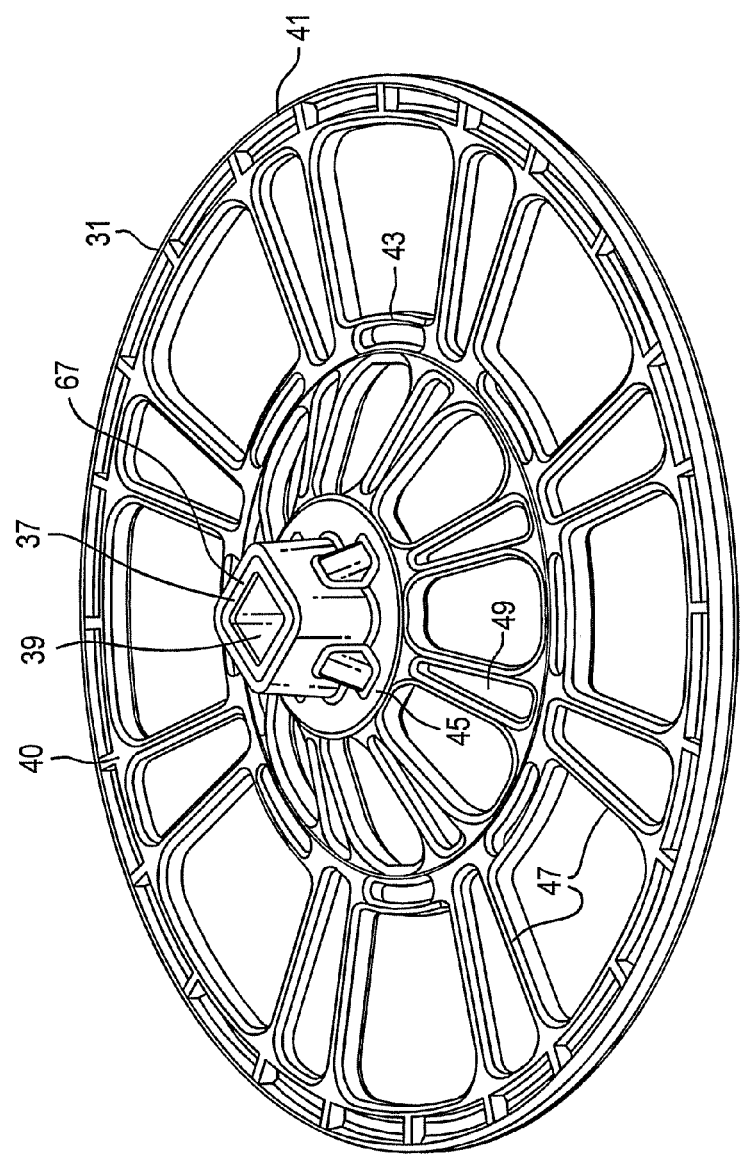
FIG. 4 is an isometric view of the back side of the handbrake wheel of the present invention.
Figure 5:
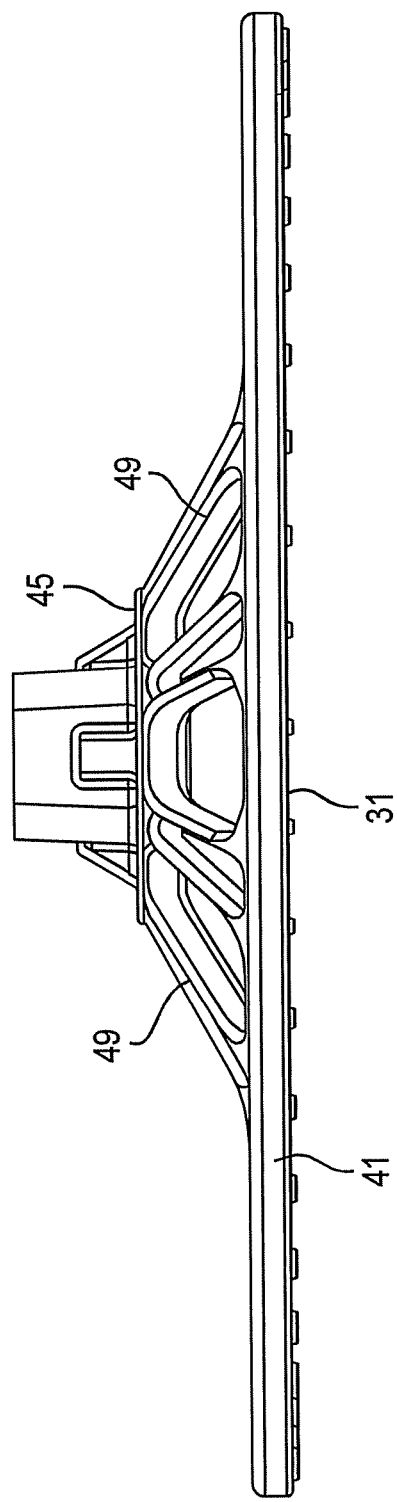
FIG. 5 is a side elevational view of the handbrake wheel.
Figure 6:
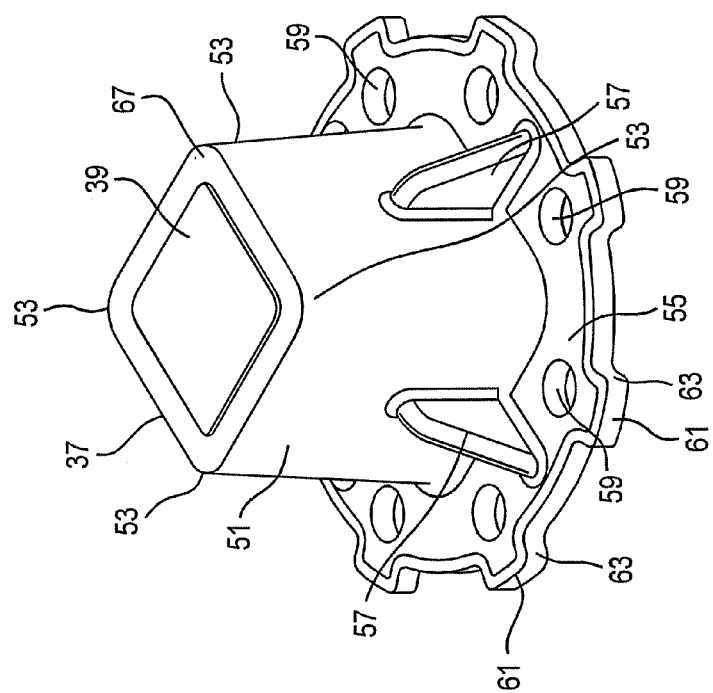
FIG. 6 is an isometric view showing the back side of the center insert of the wheel.
Figure 7:
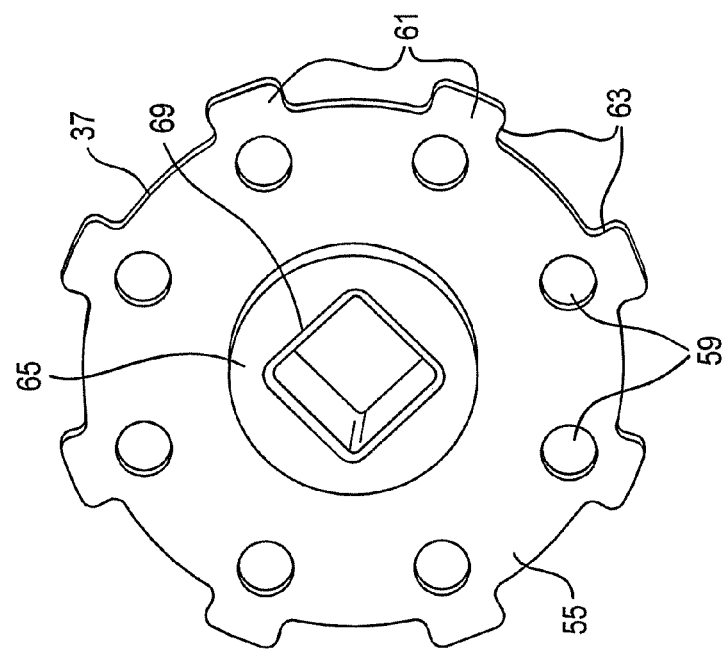
FIG. 7 is another view showing the opposite, or front, side of this center insert that is shown in FIG. 6.
Figure 10:
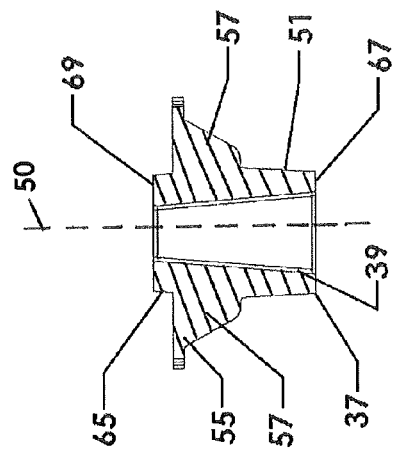
FIG. 10 is a cross-sectional view of the center insert, taken through lines X-X of FIG. 9.
Figure 9:
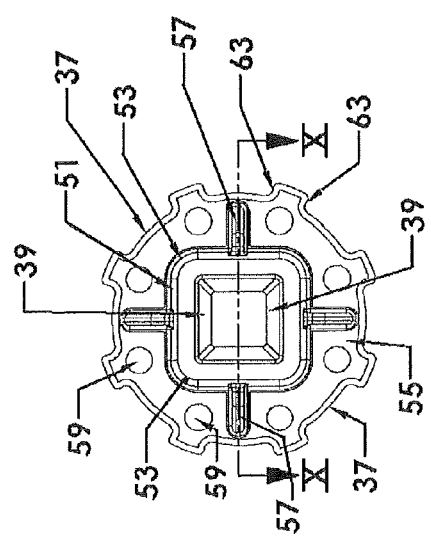
FIG. 9 is a plan view of the back side of the center insert.
Figure 8:
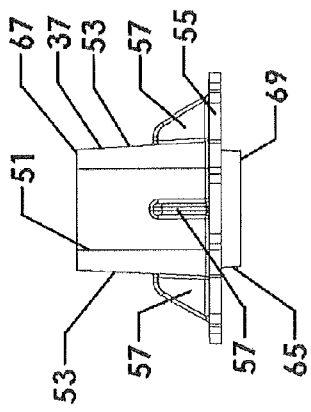
FIG. 8 is an elevational view of the center insert.

The handbrake wheel 31 of the present invention is shown in FIGS. 3-5. The handbrake wheel 31 is made of plastic, with the exception of a metal center insert, or hub, 37. The center insert 37 has a square opening 39 for receiving the shaft 33 (shown in FIGS. 1-2).

The wheel 31 has a rim 40 which surrounds the center insert 37 and makes up the remainder of the wheel 31. In one embodiment, the rim 40 has an outer rim 41 and an intermediate rim 43 spaced between the outer rim and a central area 45. The outer rim 41 and intermediate rim 43 are connected by outer spokes 47. The intermediate rim 43 is connected to the central area 45 by inner spokes 49. As shown in FIGS. 3 and 5, the outer and intermediate rims 41, 43 are coplanar, while the central area 45 is offset from the rim plane.

In another embodiment, the openings between the inner spokes are removed so as to form a solid member from the central area 45 to the intermediate rim 43. This embodiment replaces the spokes 49 with solid plastic. In still another embodiment, the openings between the outer spokes 47 are removed so as to form a solid member from the central area 45 to the outer rim 41. This embodiment replaces the spokes 47, 49 with solid plastic.

The center insert 37 is shown in FIGS. 6-10. The opening 39 has a rotational axis 50, which is the axis of rotation of the shaft 33. The center insert 37 has a polygonal body 51, when viewed in cross-section along the axis 50. The body has rounded corners 53. In the preferred embodiment, the body is rectangular. The opening 39 tapers in longitudinal cross-sectional area (see FIG. 10), becoming larger from the front side to the back side (see FIG. 11). The wall thickness of the body 51 decreases from the front side to the back side. A plate 55 is provided adjacent to the front end of the body 51. The plane of the plate 55 is transverse to the axis 50; thus the plate extends radially out from the body 51. Gussets 57 are provided to reinforce the coupling of the body 51 to the plate 55. There is a gusset 57 on each side of the body 51. The plate 55 is provided with holes 59 therethrough. The holes 59 are spaced between the gussets 57. The plate 55 has an outer edge 63. The outer edge 63 of the plate has teeth 61, which teeth increase the surface area of the edge 63. The combination of the corners 53, the gussets 57, the plate holes 59 and the plate outer edge teeth 61 significantly increase the shear strength between the insert 37 and the rim.

The body 51 has an end surface 67. The center insert has another end surface 69 opposite of the body end surface 67. The end surface 69 is incorporated into a boss 65 that protrudes from the plate 55.

The center insert 37 is a one-piece cast member. In the preferred embodiment, the center insert is made of aluminum, although other metals can be used. The rim is made of plastic, such as high density polyethylene (HDPE).

Figure 11:
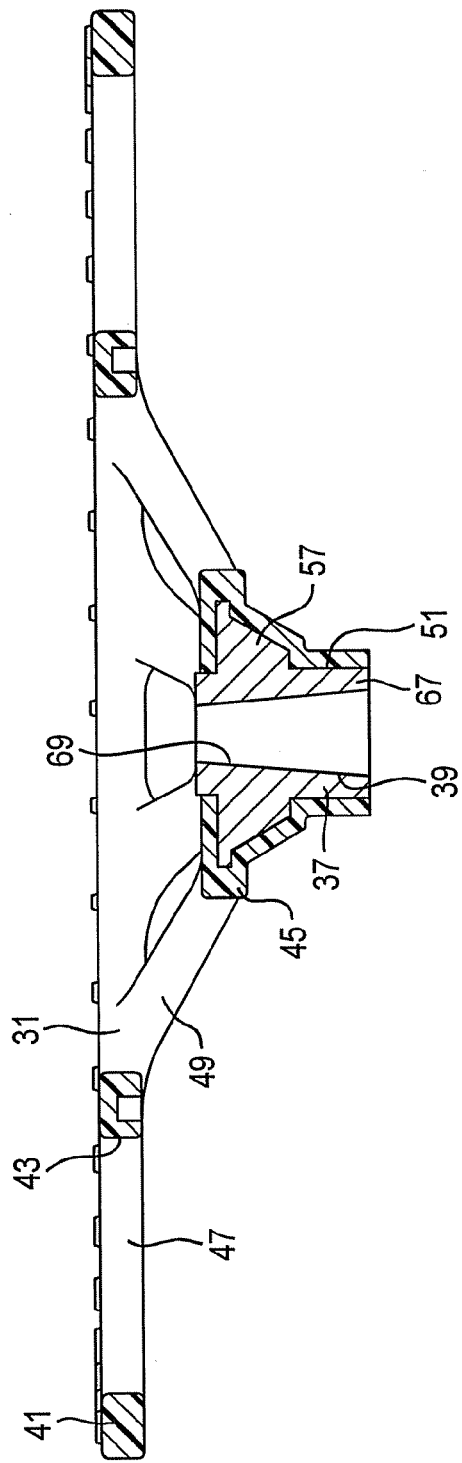
FIG. 11 is a cross-sectional view of the wheel, taken through lines XI-XI of FIG. 3.

To make the wheel, the center insert 37 is placed in a mold, such as an injection mold. The plastic rim 40 portions of the wheel (the rims 41, 43, the central area 45 and the spokes 47, 49) are molded around the center insert. The center insert 37 is entirely contained within the central area 45 of the plastic portion of the wheel, with the exception of the end surfaces 67 and 69 as shown in FIG. 11. The plate 55 is set off from the end surface 69 by the boss 65.

The wheel 31 is mounted to the shaft 33. A washer contacts the end surface 69 and a nut threads onto the shaft to secure the wheel to the shaft.

In use, the handbrake wheel 31 is turned only occasionally. The wheel 31 is on the end of the shaft 33. Because the wheel 31 is non-metal, the wheel is lighter than the prior art metal wheel. In the preferred embodiment, the wheel weighs only 4½ pounds. The prior art wheel weighs 14½ pounds. The lighter wheel presents a lower load on the shaft bearings as the rolling stock is moving, resulting in longer bearing life.

When the wheel 31 is turned, the force applied to the rim 40 is transferred to the center insert 37 and the shaft 33. The center insert 37 is strongly coupled to the plastic central area 45 of the wheel. When the wheel 31 is turned so as to rotate the shaft 33, shear forces will be applied to the coupling between the center insert and the plastic component of the wheel. The center insert 37 resists the shear forces with the corners 53 on the body 51, with the gussets 57, with the holes 59, which receive plastic during the molding process, and with the edge surfaces 61, 63 of the plate outer edge. Thus, the center insert 37 is securely coupled to the central area 45 of the plastic wheel and will exhibit a long life in use. The sides of the body 51 can be etched or grooved to increase the bonding of the body with the rim 40.

Figure 12:
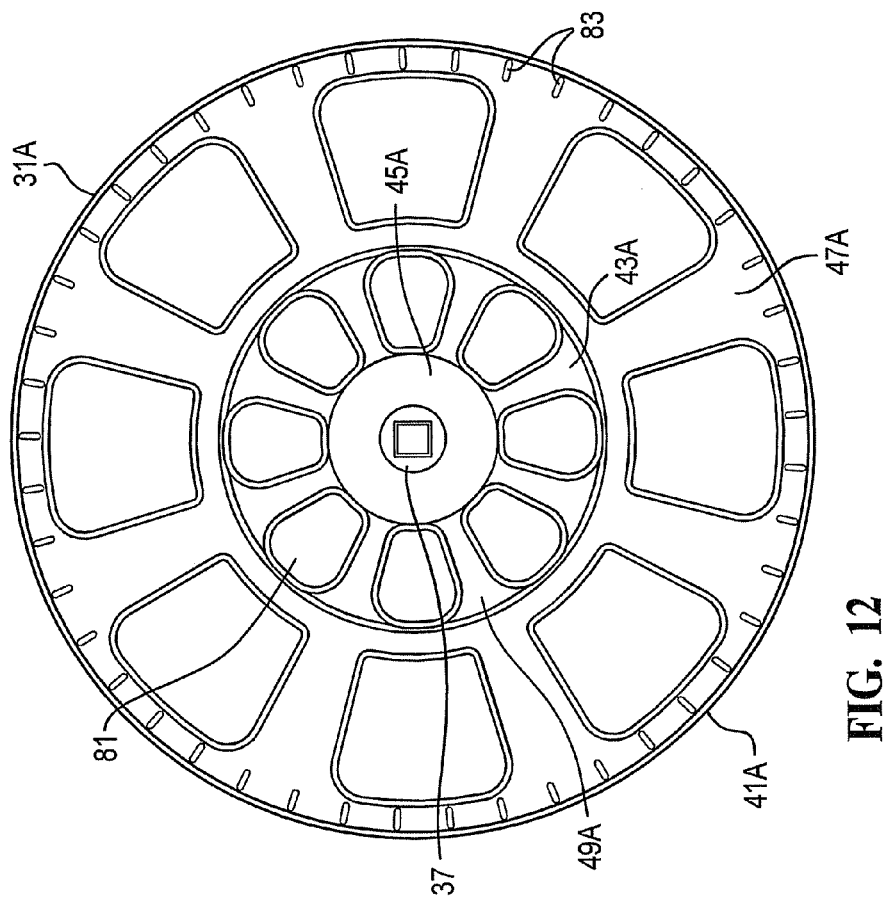
FIG. 12 is a plan view of the wheel of the present invention, in accordance with another embodiment.

FIG. 12 shows another embodiment of the wheel 31A. The inner spokes 49A between the central area 45A and the intermediate rim 43A are formed by circles 81 and form a strong and sturdy wheel configuration.

The wheels 31, 31A are known as "shallow dish" wheels. As shown in FIG. 11, the center insert 37 is offset from the outer rim 41. The offset is longitudinal relative to the shaft longitudinal axis. The offset can be increased to provide a "deep dish" wheel. Such a deep dish wheel is preferred where the wheel is installed subject to an obstruction, such as a ladder or platform. The offset provides clearance for the wheel rims from the obstruction. Either wheel 31, 31A can be provided with a deeper offset.

Also, the wheels 31, 31A can have roughened gripping surfaces. The outer rims 41, 41A and outer spokes 47, 47A can be roughened to increase the grip of an operator's hand and reduce the tendency of the hand to slip on the wheel. As shown in FIG. 12, roughening can occur by providing bosses or ribs 83. The ribs 83 are located on the outer rim 41A between the spokes 47A. The ribs are located on both the front side and the back side of the outer rim. An operator's fingers grip the outer rim 41A at these locations. The fingers fit between the ribs 83. Also, a diamond pattern is formed on the outer rim 41A between the ribs 83 and on the outer spokes 47A. The other surfaces of the outer rim and outer spokes are roughened with a grit texture, for example such as an 80 grit surface. The roughened surfaces are part of the mold so as to be incorporated into the wheel during the molding process and reduce post-molding processing. Even with the roughened gripping surfaces, the wheel 31, 31A lacks the burrs and sharp edges of the prior art metal wheel, thereby reducing the risk of injury to an operator's hands.

Although the center insert 37 has been described as being made of metal, it could be made of plastic for an all-plastic wheel, or it could be made of some other material. The center insert 37 is made of a harder material than the rim 41. Because the center insert 37 contacts the shaft 33, it must be sufficiently hard to engage the shaft and turn the shaft without stripping or wearing. However, hard materials are typically more brittle than softer materials. The remainder of the wheel, namely the rim, is made of a softer material so as to make the wheel less brittle and stronger.

Examples of plastic materials for the center insert 57 are reinforced nylon (PA), polyphelene oxide (PPO), polyethermide (PEI), polyphthalamide (PPA), phelene (PPE), liquid crystal polymer (LCP), polyaryletherkeytone (PAEK), polyetherketoneetherketoneketone (PEKEKK), polyetheretherketone (PEEK), and metal injection molding (MIM). The center insert can be made of fiber filled (such as carbon fiber) plastic.

Although the present invention has been described in conjunction with handbrake wheels, the wheel can be used in other applications on rolling stock. For example, many railroad cars have plug doors. The plug doors are opened with handles or bars. One problem with opening the plug door using a handle or bar is that when an operator tries to open the door, the handle or bar can snap back and spin, causing injury to the operator.

The wheel of the present invention can be retrofitted on to the shaft by removing the handle or bar and replacing it with the wheel. Thus, the wheel can be used to open and close plug doors on rolling stock.

The foregoing disclosure and showings made in the drawings are merely illustrative of the principles of this invention and are not to be interpreted in a limiting sense.

The invention claimed is:

1. A railroad rolling stock wheel for use in manually turning a shaft, comprising:
   a) a hub made of a first material, the hub having an opening that is structured and arranged to receive the shaft, the opening having a rotational axis, the hub having an exterior around the rotational axis, the hub exterior having drive surfaces relative to the rotational axis;
   b) a rim molded about the hub so as to engage the drive surfaces so that when the rim is rotated, the rim rotates the hub by way of the drive surfaces, the rim having an outer periphery structured and arranged to be gripped by a human hand for rotating the wheel, the rim made of a second material that is softer than the first material;
   c) the hub comprises a tube portion incorporating the opening, the tube portion having at least some of the drive surfaces in the form of flat surfaces forming a polygon when viewed in cross-section along the rotational axis;
   d) the hub comprises a plate extending radially from the tube portion, the plate having other of the drive surfaces;
   e) the tube portion and the plate being encompassed by the rim;
   f) the plate comprises holes therethrough, the holes being separate from the hub opening, the holes comprising the other of the drive surfaces.

2. The wheel of claim 1 further comprising gussets coupled between the tube portion and the plate, the gussets forming still other of the drive surfaces.

3. A railroad rolling stock wheel for use in manually turning a shaft, comprising:
   a) a hub made of a first material, the hub having an opening that is structured and arranged to receive the shaft, the opening having a rotational axis, the hub having an exterior around the rotational axis, the hub exterior having drive surfaces relative to the rotational axis;
   b) a rim molded about the hub so as to engage the drive surfaces so that when the rim is rotated, the rim rotates the hub by way of the drive surfaces, the rim having an outer periphery structured and arranged to be gripped by a human hand for rotating the wheel, the rim made of a second material that is softer than the first material;
   c) the hub comprises a tube portion incorporating the opening, the tube portion having at least some of the drive surfaces in the form of flat surfaces forming a polygon when viewed in cross-section along the rotational axis;
   d) the hub comprises a plate extending radially from the tube portion, the plate having other of the drive surfaces;
   e) the tube portion and the plate being encompassed by the rim;
   f) the plate comprises teeth around an outer edge of the plate, the teeth comprising the other of the drive surfaces;
   g) gussets coupled between the tube portion and the plate, the gussets forming still other of the drive surfaces.

4. A railroad rolling stock car, comprising:
   a) a truck for engaging a rail;
   b) a shaft separate from the truck;
   c) a wheel comprising a hub made of a first material, the hub having an opening that receives the shaft, the hub having an exterior, the hub exterior having drive surfaces relative to the shaft;
   d) the wheel comprising a rim molded about the hub so as to engage the drive surfaces, the rim applying rotational force to the hub by way of the drive surfaces, the rim having an outer periphery structured and arranged to be gripped by a human hand for rotating the wheel, the rim made of a second material that is softer than the first material;
   e) the hub comprises:
      i) a tube portion incorporating the opening, the tube portion having at least some of the drive surfaces in the form of flat surfaces forming a polygon when viewed in cross-section along the rotational axis;
      ii) a plate extending radially from the tube portion, the plate having other of the drive surfaces;
      iii) the tube portion and the plate being encompassed by the rim;
   f) the plates comprises holes therethrough, the holes being separate from the hub opening, the holes comprising the other of the drive surfaces;
   g) the wheel being exposed to the weather.

5. The railroad rolling stock car of claim 4, wherein the shaft is a handbrake shaft.

6. The railroad rolling stock car of claim 4, further comprising gussets coupled between the tube portion and the plate, the gussets forming still other of the drive surfaces.

7. The railroad rolling stock car of claim 4, wherein the hub is made of metal and the rim is made of plastic.

8. The railroad rolling stock car of claim 4, wherein the hub is made of a first plastic and the rim is made of a second plastic.

* * * * *